(12) United States Patent
Scott

(10) Patent No.: US 6,522,642 B1
(45) Date of Patent: *Feb. 18, 2003

(54) ANTENNA DIVERSITY TECHNIQUES

(75) Inventor: Logan Scott, Breckenridge, CO (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/109,502

(22) Filed: Jul. 2, 1998

Related U.S. Application Data

(63) Continuation of application No. 08/555,117, filed on Nov. 8, 1995, now Pat. No. 5,859,842, which is a continuation of application No. 08/334,587, filed on Nov. 3, 1994, now Pat. No. 5,742,583.

(51) Int. Cl.[7] .............................................. H04J 13/00
(52) U.S. Cl. ...................................... 370/342; 370/441
(58) Field of Search ............................... 370/441, 320, 370/324, 335, 336, 342, 479, 273, 272, 275, 561, 562, 313, 334, 339, 340, 327, 209, 208, 210, 204, 203, 130, 140, 303, 304; 455/273, 272, 275, 271.1, 561, 562, 6.1, 525, 524, 3.02, 3.05, 3.06, 67.3; 375/130, 133, 134, 137, 138, 139, 140, 149, 148, 273, 275, 279, 280, 284, 285, 283; 380/20; 342/537.1, 537.15, 537.16

(56) References Cited

U.S. PATENT DOCUMENTS

| | | | |
|---|---|---|---|
| 4,189,677 A | 2/1980 | Cooper et al. | 325/321 |
| 4,222,115 A | 9/1980 | Cooper et al. | 375/1 |

(List continued on next page.)

FOREIGN PATENT DOCUMENTS

| | | | |
|---|---|---|---|
| AU | 39844/85 | 9/1985 | H04B/7/26 |
| CA | 2004808 | 6/1990 | |

(List continued on next page.)

OTHER PUBLICATIONS

Mohsen Kavehrad et al., *Direct Sequence Spread Spectrum with DPSK Modulation and Diversity for Indoor Wireless Communications*, IEEE Transactions on Communications, Feb. 1987, vol. COM–35, No. 2, pp. 224–226.

Payne Freret, *Wireless Terminal Communications Using Spread–Spectrum Radio,* Proceedings of the IEEE, 1980, pp. 244–248.

(List continued on next page.)

*Primary Examiner*—Dang Ton
(74) *Attorney, Agent, or Firm*—Kenneth J. Cool

(57) ABSTRACT

A receiver system for antenna diversity employing a single backhaul cable. A single backhaul cable couples a receiver to a plurality of antennas. The signals from the antennas are combined onto the single backhaul cable using frequency offsets, spread spectrum code division, time division, or a combination thereof. At the receiver, the signals from the antennas are decoupled. In the case of the frequency offsets, the antenna signals are decoupled by splitting the backhaul signal into a plurality of duplicate signals, frequency shifting selected ones of the duplicate signals, and correlating said frequency shifted signals. In the case of spread spectrum code division, the antenna signals are decoupled by splitting the backhaul signal into a plurality of duplicate signals and demultiplexing each of the duplicate signals with a different spread spectrum code. One or more antennas may be selected for communication in response decoupling the antenna signals.

25 Claims, 6 Drawing Sheets

U.S. PATENT DOCUMENTS

| | | | |
|---|---|---|---|
| 4,285,060 A | 8/1981 | Cobb et al. | 375/1 |
| 4,291,410 A | 9/1981 | Caples | 375/1 |
| 4,301,530 A | 11/1981 | Gutleber | 370/1 |
| 4,314,393 A | 2/1982 | Wakatsuki et al. | 29/25.35 |
| 4,324,001 A | 4/1982 | Rhodes | 375/90 |
| 4,327,438 A | 4/1982 | Baier et al. | 375/1 |
| 4,338,579 A | 7/1982 | Rhodes | 332/21 |
| 4,384,358 A * | 5/1983 | Shiki et al. | 375/347 |
| 4,418,425 A | 11/1983 | Fennel et al. | 455/27 |
| 4,423,519 A | 12/1983 | Bennett et al. | 375/80 |
| 4,455,651 A | 6/1984 | Baran | 370/104 |
| 4,481,640 A | 11/1984 | Chow et al. | 375/1 |
| 4,517,679 A | 5/1985 | Clark et al. | 375/37 |
| 4,550,414 A | 10/1985 | Guinone et al. | 375/1 |
| 4,561,089 A | 12/1985 | Rouse et al. | 370/1 |
| 4,563,774 A | 1/1986 | Gloge et al. | 455/607 |
| 4,567,588 A | 1/1986 | Jerrim | 370/18 |
| 4,587,662 A | 5/1986 | Langewellpott | 375/1 |
| 4,601,047 A | 7/1986 | Horwitz et al. | 375/2.2 |
| 4,606,039 A | 8/1986 | Nicolas et al. | 375/1 |
| 4,630,283 A | 12/1986 | Schiff | 375/1 |
| 4,641,317 A | 2/1987 | Fullerton | 375/1 |
| 4,647,863 A | 3/1987 | Skudera et al. | 329/112 |
| 4,649,549 A | 3/1987 | Halpern et al. | 380/32 |
| 4,660,164 A | 4/1987 | Leibowitz | 364/728 |
| 4,672,658 A | 6/1987 | Kavehrad et al. | 379/63 |
| 4,675,863 A | 6/1987 | Paneth et al. | 370/50 |
| 4,688,210 A | 8/1987 | Eizenhöfer et al. | 370/18 |
| 4,691,326 A | 9/1987 | Tauchiya | 375/1 |
| 4,701,904 A | 10/1987 | Darcie | 370/3 |
| 4,703,474 A | 10/1987 | Foschini et al. | 370/18 |
| 4,707,839 A | 11/1987 | Andren et al. | 375/1 |
| 4,724,435 A | 2/1988 | Moses et al. | 340/870.13 |
| 4,736,371 A | 4/1988 | Tejima et al. | 370/95 |
| 4,754,453 A | 6/1988 | Eizenhöfer | 370/95 |
| 4,759,034 A | 7/1988 | Nagazumi | 375/1 |
| 4,759,078 A | 7/1988 | Schiller | 455/49 |
| 4,774,715 A | 9/1988 | Messenger | 375/1 |
| 4,797,947 A | 1/1989 | Labedz | 455/33 |
| 4,804,938 A | 2/1989 | Rouse et al. | 340/310 |
| 4,807,222 A | 2/1989 | Amitay | 370/85 |
| 4,813,057 A | 3/1989 | Fullerton | 375/37 |
| 4,815,106 A | 3/1989 | Propp et al. | 375/36 |
| 4,817,089 A | 3/1989 | Paneth et al. | 370/95 |
| 4,837,786 A | 6/1989 | Gurantz et al. | 370/20 |
| 4,864,589 A | 9/1989 | Endo | 375/1 |
| 4,866,732 A | 9/1989 | Carey et al. | 375/1 |
| 4,894,842 A | 1/1990 | Brockhoven et al. | 375/1 |
| 4,901,307 A | 2/1990 | Gilhousen et al. | 370/18 |
| 4,905,221 A | 2/1990 | Ichiyoshi | 370/18 |
| 4,912,705 A | 3/1990 | Paneth et al. | 370/95.1 |
| 4,918,689 A | 4/1990 | Hui | 370/85.9 |
| 4,953,197 A | 8/1990 | Kaewell | 379/58 |
| 4,972,431 A | 11/1990 | Keegan | 375/1 |
| 4,984,247 A | 1/1991 | Kaufmann et al. | 375/1 |
| 5,005,183 A | 4/1991 | Carey et al. | 375/1 |
| 5,016,255 A | 5/1991 | Dixon et al. | 375/1 |
| 5,018,165 A | 5/1991 | Sohner et al. | 375/1 |
| 5,022,024 A | 6/1991 | Paneth et al. | 370/50 |
| 5,022,047 A | 6/1991 | Dixon et al. | 375/1 |
| 5,029,184 A | 7/1991 | Andren et al. | 375/1 |
| 5,056,109 A | 10/1991 | Gilhousen et al. | 375/1 |
| 5,063,560 A | 11/1991 | Yerbury | 370/18 |
| 5,067,173 A * | 11/1991 | Gordon et al. | 455/275 |
| 5,073,899 A | 12/1991 | Collier et al. | 375/1 |
| 5,073,900 A | 12/1991 | Mallinkdrodt | 375/1 |
| 5,081,642 A | 1/1992 | O'Clock et al. | 375/1 |
| 5,093,840 A | 3/1992 | Schilling | 375/1 |
| 5,097,484 A | 3/1992 | Akaiwa | 375/40 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,119,375 A | 6/1992 | Paneth et al. | 370/95.1 |
| 5,121,391 A | 6/1992 | Paneth et al. | 370/95.1 |
| 5,146,471 A | 9/1992 | Cowart | 375/1 |
| 5,153,598 A | 10/1992 | Alves | 342/352 |
| 5,170,412 A | 12/1992 | Massey | 375/1 |
| 5,185,610 A | 2/1993 | Ward et al. | 342/357 |
| 5,206,882 A | 4/1993 | Scholemer | 375/1 |
| 5,210,771 A | 5/1993 | Schaeffer et al. | 375/1 |
| 5,218,618 A | 6/1993 | Sagey | 375/1 |
| 5,224,120 A | 6/1993 | Schilling | 375/1 |
| 5,228,053 A | 7/1993 | Miller et al. | 375/1 |
| 5,228,056 A | 7/1993 | Schilling | 375/1 |
| 5,231,646 A | 7/1993 | Heath et al. | 375/1 |
| 5,241,690 A | 8/1993 | Larsson et al. | 455/54.1 |
| 5,243,622 A | 9/1993 | Lux et al. | 375/1 |
| 5,257,283 A | 10/1993 | Gilhousen et al. | 375/1 |
| 5,265,119 A | 11/1993 | Gilhousen et al. | 375/1 |
| 5,267,262 A | 11/1993 | Wheatley | 375/1 |
| 5,274,665 A | 12/1993 | Schilling | 375/1 |
| 5,276,920 A * | 1/1994 | Kuisma | 455/101 |
| 5,280,472 A | 1/1994 | Gilhousen et al. | 370/18 |
| 5,280,537 A | 1/1994 | Sugiyama et al. | 375/1 |
| 5,289,497 A | 2/1994 | Jacobson et al. | 375/1 |
| 5,291,515 A | 3/1994 | Uchida et al. | 375/1 |
| 5,299,226 A | 3/1994 | Schilling | 375/1 |
| 5,347,535 A | 9/1994 | Karasawa et al. | 375/1 |
| 5,351,269 A | 9/1994 | Schilling | 375/1 |
| 5,383,219 A | 1/1995 | Wheatley et al. | 375/1 |
| 5,392,459 A | 2/1995 | Baba et al. | 455/69 |
| 5,402,413 A | 3/1995 | Dixon | 370/18 |
| 5,410,568 A | 4/1995 | Schilling | 375/205 |
| 5,414,728 A | 5/1995 | Zehavi | 375/200 |
| 5,416,797 A | 5/1995 | Gilhousen et al. | 370/18 |
| 5,446,756 A | 8/1995 | Mallinckrodt | 375/200 |
| 5,481,570 A | 1/1996 | Winters | 375/347 |
| 5,515,378 A | 5/1996 | Roy, III et al. | 370/95.1 |
| 5,548,819 A | 8/1996 | Robb | 455/59 |
| 5,734,648 A * | 3/1998 | Adachi et al. | 370/342 |
| 5,742,583 A * | 4/1998 | Scott | 370/342 |
| 5,809,060 A * | 9/1998 | Cafarella et al. | 375/146 |
| 5,835,857 A * | 11/1998 | Otten | 455/410 |
| 5,859,842 A * | 1/1999 | Scott | 370/342 |
| 6,108,561 A * | 8/2000 | Mallinckrodt | 455/522 |

FOREIGN PATENT DOCUMENTS

| | | | |
|---|---|---|---|
| EP | 0219085 | 4/1987 | H04Q/7/26 |
| EP | 0361299 | 4/1990 | H04B/7/26 |
| WO | WO 87/00370 | 1/1987 | H04J/13/00 |
| WO | WO 93/18596 | 9/1993 | H04J/3/16 |
| WO | WO 93/18601 | 9/1993 | H04L/27/30 |
| WO | WO 95/01018 | 1/1995 | H04K/1/00 |
| WO | WO 95/03652 | 2/1995 | H04B/7/26 |
| WO | WO 95/06365 | 3/1995 | H04B/7/04 |
| WO | WO 95/12296 | 5/1995 | H04Q/7/38 |
| WO | WO 95/12938 | 5/1995 | H04J/13/001 |
| WO | WO 95/12943 | 5/1995 | H04L/25/02 |

OTHER PUBLICATIONS

M. Kavehrad and P. J. McLane, *Performance of Low–Complexity Channel Coding and Diversity for Spread Spectrum in Indoor, Wireless Communication,* AT&T Technical Journal, vol. 64, No. 8, Oct. 1985, pp. 1927–1965.

Kavehrad, M. and McLane, P. J., *Spread Spectrum for Indoor Digital Radio,* IEEE Communications Magazine, Jun. 1987, vol. 25, No. 5, at 32–40.

J. H. Collins & P. M. Grant, *The Role of Surface Acoustic Wave Technology in Communication Systems,* Ultrasonics, Mar. 1972, vol. 10, No. 2, pp. 59–71.

Jurg Ruprecht, *Code Time Division Multiple Access: A Method for the Orthogonalization of CDMA Signals in Multipath Environment,* Aachener Kolloquium "Signal Theorie", "Mobile Kommunikation Systems", Mar. 1994, pp. 1–8.

Adel A. M. Saleh et al., *An Experimental TDMA Indoor Radio Communications System Using Slow Frequency Hopping and Coding,* IEEE Transactions on Communications, Jan. 1991, vol. 39, No. 1, pp. 152–161.

Roger D. Colvin, *Correlators and Convolvers Used In Spread Spectrum Systems,* National Telecommunications Conference, Conference Record vol. 1 of 4, 1982, pp. 22.4.1–22.4.5.

Rodger E. Ziemer, Carl R. Ryan and James H. Stilwell, *Conversion and Matched Filter Approximations for Serial Minimum–Shift Keyed Modulation,* IEEE Transactions on Communications, vol. Com. 30, No. 3, Mar. 1982, pp. 495–509.

Manfred G. Unkauf, *Surface Wave Devices in Spread Spectrum Systems,* Surface Wave filters (Wiley 1977), pp. 477–509.

Marvin N. Cohen, Marshall R. Fox, and J. Michael Baden, *Minimum Peak Sidelobe Pulse Compression Codes,* IEEE International Radar Conference, 1990, pp. 633–638.

Colin K. Campbell, *Applications of Surface Acoustics and Shallow Bulk Acoustic Wave Devices,* Proceedings of the IEEE, Oct. 1989, pp. 1453–1484.

Dixon, Robert C., *Spread Spectrum Systems,* (J. Wiley & Sons, 2d Ed. n1984).

In the Matter of: Amendment of the Commission's Rules to Establish New Personal Communications Services Tentative Decision and Memorandum Opinion and Order Released: Nov. 6, 1992.

Mohanty, Nirode C., *Spread Spectrum and Time Division Multiple Access Satellite Communications,* Transactions on Communications, vol. Com–25, No. 8, Aug. 1977, pp. 810–815.

Joint Technical Committee on Wireless Access—JTC (Air) Standards Contribution (Air Interface Standards Project) Date: Mar. 21, 1994.

Omnipoint Corporation—FCC Experimental License Semi-annual Progress Report—Apr. 1992.

* cited by examiner

ANTENNA DIVERSITY TECHNIQUES

This is a continuation application of U.S. Ser. No. 08/555,117 filed Nov. 8, 1995, which is now U.S. Pat. No. 5,859,842, which is a a continuation of U.S. patent application Ser. No. 08/334,587 filed Nov. 3, 1994 which is now U.S. Pat. No. 5,742,583.

BACKGROUND OF THE INVENTION

1. Field of the Invention

The present invention pertains to the field of communications and, in particular, to combining diverse antenna signals.

2. Description of Related Art

Signals propagating in a near earth environment are subject to fading because of multipath effects, obstructions, antenna nulls, and other effects. One known technique for mitigating fading effects is antenna diversity, also called space diversity. This known technique takes advantage of the fact that signal fading is generally not the same at all locations; rather, signal fading may vary rapidly at a given location due to changes in relative position of a transmitter with respect to a receiving antenna or antennas (some of which may be mobile), interference, signal echoing, and other foreseeable and unforeseeable factors. In some cases, for example, the quality of a received signal at a given antenna location may vary over periods as short as ten milliseconds or less, depending on factors such as vehicle speed (when communication is with a mobile unit.

To mitigate the effects of fading, multiple antennas are used to collect energy at physically separated locations. Subsequent processing may then attempt to select a single antenna providing the best signal/noise ratio, on a dynamic basis. It is also known to combine energy from the multiplicity of antennas to attempt to maximize the signal/noise ratio.

Because antenna diversity relies on the fact that antennas are located in different physical locations, the antennas may be physically separated from each other and from the receiver by large distances. When the antennas are physically separated from the receiver electronics, conventional practice is to run separate cables coupling each antenna to the receiver, called "backhaul cables". While this conventional technique may achieve the purpose of coupling the receiver to all of the antennas, it is subject to the drawback that when a physical separation between the antennas and the receiver is large, running multiple backhaul cables can be costly. For example, it is not unusual for an antenna to be separated from the receiver by as much as five miles. Using multiple backhaul cables to service multiple antennas over such distances may entail substantial expense.

The need for multiple backhaul cables to transmit the signal bandwidths required by multiple antennas has further drawbacks as well. For example, there is presently a desire to utilize the existing cable TV infrastructure to provide various telecommunication and other multimedia services. Thus, backhaul cables associated with existing cable TV systems may be utilized to carry a variety of telecommunications data including, for example, television, video, cellular, fax, voice communication, and other types of data. In many cases, however, the backhaul capabilities of conventional cable TV systems, which often have only a single backhaul cable available, are insufficient to handle the bandwidth required to support antenna diversity for cellular systems or other telecommunication systems.

It would therefore be advantageous to provide a technique that minimizes the number of backhaul cables needed to couple a plurality of antennas to a receiver. It would further be advantageous to provide a technique for increasing the amount of data that may be transmitted over existing backhaul cables having limited bandwidth capabilities.

SUMMARY OF THE INVENTION

The invention provides in one aspect a technique for antenna diversity minimizing the number of backhaul cables needed for a plurality of antennas. In one embodiment, a single cable couples the receiver to a plurality of antennas, and the signals from the antennas are combined onto the single cable. The technique for combining onto a single backhaul cable may employ frequency offsets, spread spectrum code division multiplexing, and/or time division multiplexing. At the receiver, the signals from the antennas are decoupled or otherwise separated. In the case of frequency offsets, the antenna signals are decoupled by splitting the backhaul signal into a plurality of duplicate signals, frequency shifting selected ones of the duplicate signals, and correlating said frequency shifted signals. In the case of spread spectrum code division, the antenna signals are decoupled by splitting the backhaul signal into a plurality of duplicate signals and demultiplexing each of the duplicate signals with a different spread spectrum code. One or more antennas may be selected for communication in response decoupling the antenna signals.

In a preferred embodiment, the signals from the antennas are multiplexed and demultiplexed using a spread spectrum communication technique, with isolation between the different signals being provided by the use of different spread spectrum code sequences. Antenna diversity can thus be supported without substantially increasing bandwidth requirements for the backhaul cable. In one such embodiment, a spread spectrum bandwidth for the multiplexed signals is about 10 MHz, and a frequency separation between the multiplexed signals is about 100 KHz.

BRIEF DESCRIPTION OF THE PREFERRED EMBODIMENTS

DETAILED DESCRIPTION OF THE DRAWINGS

Figure 1:
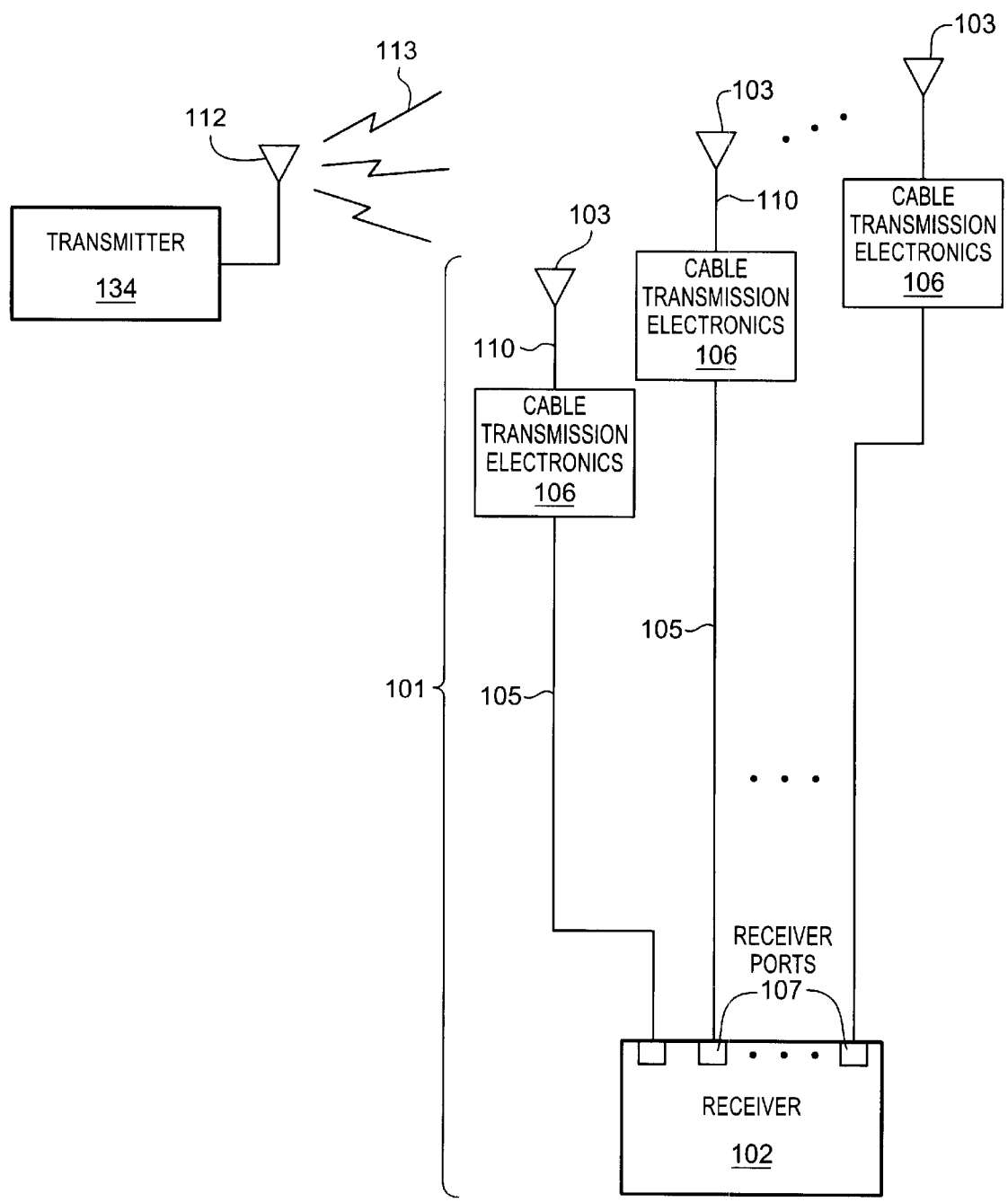
FIG. 1 is a block diagram of a receiver system as known in the art showing multiple backhaul cables for servicing multiple antennas.

Inventions described herein may be made or used in conjunction with inventions described, in whole or in part, in U.S. Pat. Nos. 5,402,413, 5,455,822, and 6,088,590, each of which is incorporated by reference as if fully set forth herein;

FIG. 1 is a block diagram of a receiver system with multiple antennas as is known in the art.

In FIG. 1, a transmitter 114 transmits an RF signal 113 over an airwave channel via an antenna 112. The RF signal 113 is received by a receiver system 101 comprising receiver electronics 102 and a plurality of antennas 103. The antennas 103 are located at a distance from the receiver electronics 102. A separate backhaul cable 105 couples the receiver electronics 102 to each of the antennas 103. Each antenna 103 is coupled to cable transmission electronics 106, which may comprise one or more amplifiers and filters, for converting the received signal to an IF signal or to some other format suitable for cable transmission as is known in the art. In these applications it may be necessary to convert the signal back to a format suitable for use by the receiver. An output of the cable transmission electronics 106 is coupled to one of the backhaul cables 105. Each backhaul cable 105 is coupled to a port 107 located at the receiver electronics 102.

The system of FIG. 1 requires multiple cables 105 to service multiple antennas 103. Further, the system of FIG. 1 requires duplicate sets of cable transmission electronics 106, one set for each of the antennas 103.

Figure 2:
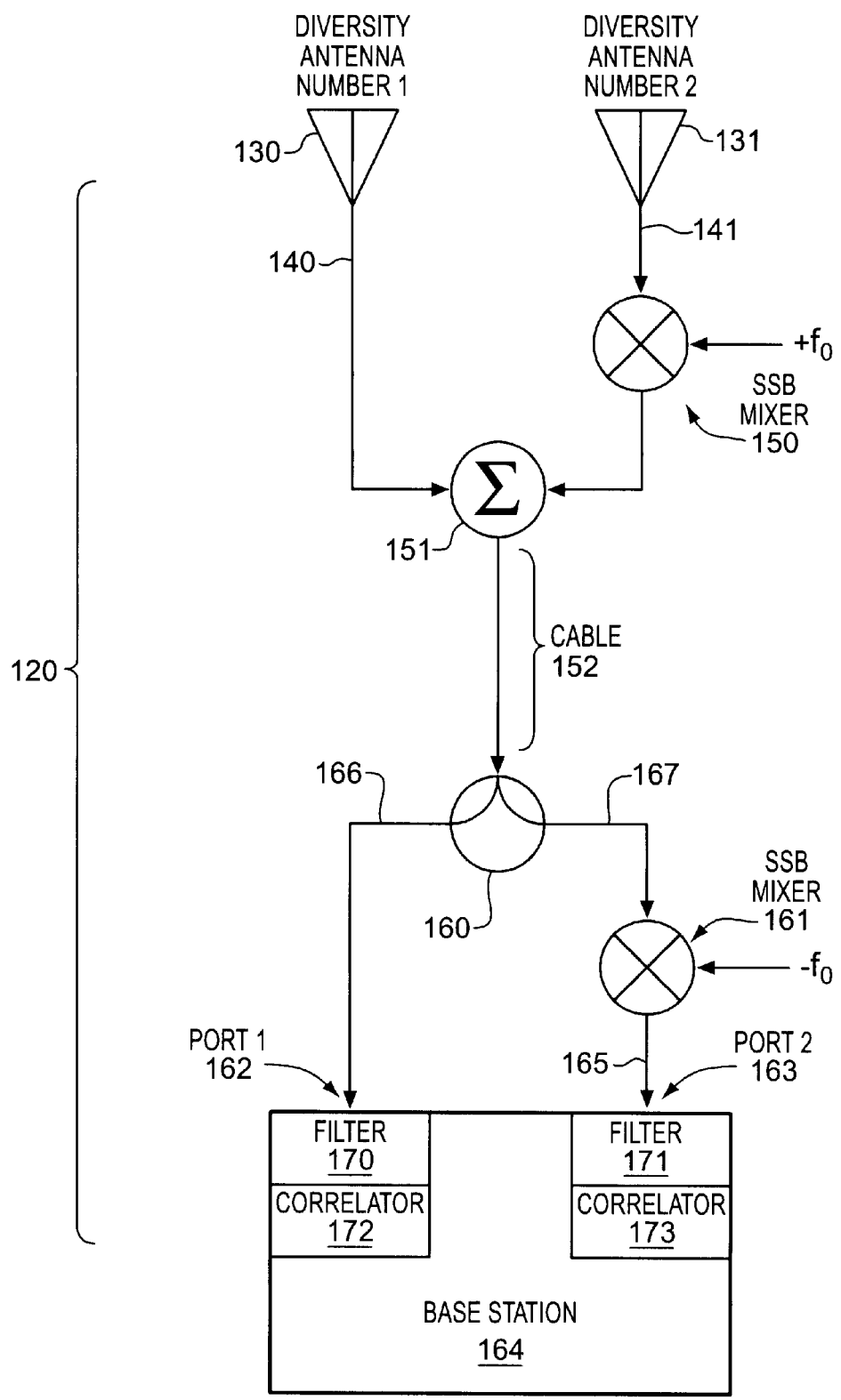
FIG. 2 is a functional block diagram of an embodiment of a multiple antenna receiver system using a single backhaul cable.

FIG. 2 is a functional block diagram of a multiple antenna receiver system using a single backhaul cable in accordance with one or more principles of the present invention. Although the FIG. 2 embodiment is shown for convenience with two antennas, the described techniques are readily adaptable to an arbitrary number of antennas as required by a particular application.

In the FIG. 2 embodiment, a receiver system 120 receives an RF signal 113 from a transmitter 114 (as shown in FIG. 1), which may be one of a plurality of transmitters 114 from which the receiver system 120 may receive the RF signal 113.

The RF signal 113 is preferably a spread spectrum signal. A spread spectrum signal is characterized by, among other things, a bandwidth exceeding the minimum bandwidth necessary to transmit the data. To generate a spread spectrum signal, a data signal may be modulated with a pseudo-random code which causes the modulated signal to have a Gaussian distribution and to appear noise-like to those not knowing the particular code used to spread the data signal. At the receiving end, the modulated signal may be despread by correlating the received signal with a locally generated version of the spread spectrum code. Spread spectrum communication techniques are further described in, e.g., Robert M. Dixon, *Spread Spectrum Systems with Commercial Applications* (John Wiley & Sons, 3d ed. 1994).

The receiver system 120 of FIG. 2 comprises at least two antennas 130 and 131 which are spatially separated. In response to receiving the transmitted signal 113, a plurality of antenna signals 140, 141 are generated by the antennas 130, 131, respectively. Because the antennas 130, 131 are spatially separated, they may experience different fading effects and path losses. The antenna signals 140, 141 may therefore differ in amplitude and phase, and may also experience slight deviations in frequency.

As explained in more detail herein, one of the antenna signals 140 or 141 is generally provided a predetermined frequency offset or displacement from the other, and the signals are then combined for transmission over a cable 152. At the opposite end of the cable 152, the combined signal is split, and an inverse frequency offset applied to one branch of the split signal in order to remove the frequency offset from that branch. As a result, the receiver simultaneously receives both antenna signals 140 or 141, and each of the antenna signals 140, 141 is overlaid with the other separated by the predetermined frequency offset. The predetermined frequency offset is selected as large enough so that the signals are sufficiently isolated from one another, but smaller than the full bandwidth of the received signal.

In more detail, as shown in a preferred embodiment of FIG. 2, it is assumed that the antenna signals 140, 141 each comprise a frequency $F_1$. The frequency $F_1$ of a selected antenna signal 141 is provided an offset $F_0$ from the frequency of the other antenna signal 140. Preferably, the frequency offset $F_0$ is achieved by multiplying the antenna signal 141 with a signal (e.g., a sine wave) having a frequency $F_0$ using a mixer 150. The mixer 150 is preferably a single sideband mixer which generates, for signal inputs having frequencies of $F_0$ and $F_1$, respectively, an output signal having a frequency of either $F_1+F_0$ or $F_1-F_0$, but not both.

In the embodiment shown in FIG. 2, the mixer 150 generates an output signal of $F_1+F_0$. However, a single sideband mixer 15 generating an output of $F_1-F_0$ may be used instead for the mixer 150, if the mixer 161, appearing downstream and described later herein, is changed correspondingly. A mixer generating both $F_1+F_0$ and $F_1-F_0$ may also be used instead of a single sideband mixer, but at the expense of more complicated demodulation hardware located downstream.

Mixer 150 may therefore be viewed as providing a frequency offset of $+F_0$ to signal 141. The frequency offset $+F_0$ is preferably kept as small as possible but large enough to maintain signal isolation with the other antenna signal 140, and its selection is described in more detail further, herein.

The antenna signal 140 and the output of the mixer 150 are combined by a summer 151. The combined signal (also called a backhaul signal herein) output from the summer 151 is transmitted along the backhaul cable 152. Prior to transmission over the cable 152, the backhaul signal is preferably downconverted to an intermediate frequency or a baseband frequency, using one or more mixers, filters, amplifiers or other electronics and reconverted to a suitable IF at the receiver end (not shown). For example, the backhaul signal may be made suitable for transmission over a coaxial cable, fiber optic cable, or other type of transmission media using techniques known in the art. Alternatively, circuitry for converting the antenna signals 140, 141 to an intermediate frequency or a baseband frequency may be located further upstream at each antenna, at the expense of additional or possibly duplicative hardware.

After transmission over the cable 152, the combined signal is split by a signal splitter 160 into two identical signals 166, 167. Signal 166 is input to a port 162 of receiver 164 (e.g., a base station) for further processing. Signal 167 is input to mixer 161. A signal (e.g., a sine wave) having a frequency $F_0$ (that is, the same frequency $F_0$ input to mixer 150) is also input to mixer 161. Mixer 161, like mixer 150, is preferably a single sideband mixer, but performs the complementary arithmetic operation as mixer 150. Thus, in the presently described embodiment, mixer 161 generates an output signal having a frequency of $F_1-F_0$ for signal inputs having frequencies of $F_0$ and $F_1$, respectively.

Mixer 161 may be viewed as providing a frequency offset of $F_0$ to signal 167. The output of the mixer 161 is a frequency shifted signal 165, which is coupled to a port 163 of the base station 164.

The structure of the base station 164 depends in part on the type of antenna selection process desired. In one embodiment, each of the ports 162, 163 comprises a filter 170, 171, respectively, which may remove noise associated with transmission over the cable 152. Signals 165 and 166 are thereby filtered and, if desired and not already done, converted to baseband signals. The outputs from the filters 170, 171 are provided to spread spectrum correlators 172, 173, respectively, for correlating and despreading the filtered signals. The outputs of the correlators 172, 173 may be analyzed by the base station 164 to determine the quality of each (e.g., by determining the signal-to-noise ratio), and one of the two outputs from correlators 172, 173 may be selected for communication by techniques further described herein.

Figure 3A:
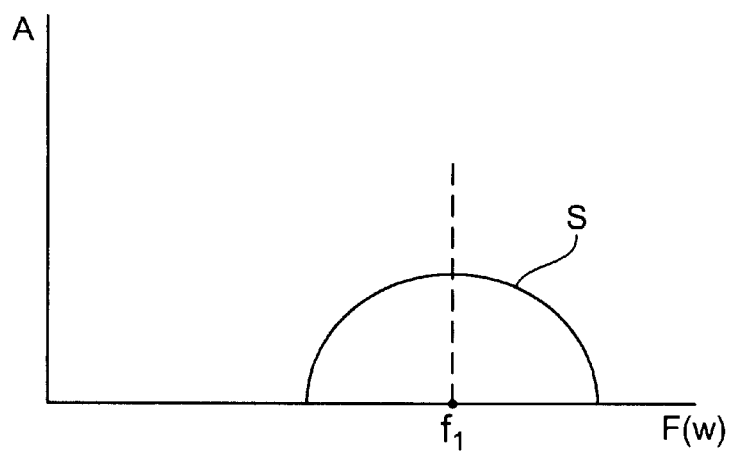
FIGS. 3A–3C are frequency domain diagrams showing the overlap of multiple antenna signals in accordance with the embodiment of FIG. 2.

Operation of the FIG. 2 system may be illustrated with reference to FIGS. 3A–3C, which are frequency domain diagrams showing the overlap of multiple antenna signals. FIG. 3A is a diagram showing a received signal S centered at a frequency $F_1$ representing a signal as it appears at antenna 130 or 131. As noted previously, the signals appearing at antennas 130 and 131 may differ in amplitude, phase, and slight amounts of frequency due to interference, multipath fading, and similar effects. For purposes of illustration and explanation, however, signal S shown in FIG. 3A is assumed to represent both signals 140 and 141 received at antennas 130 and 131, respectively.

Figure 3B:
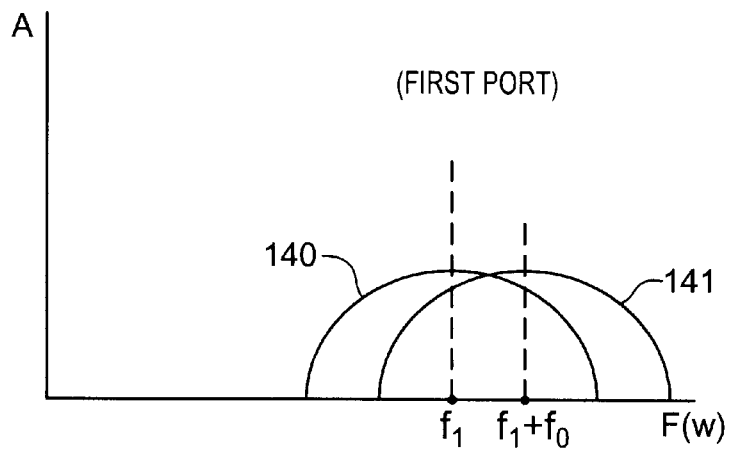
Figure 3C:
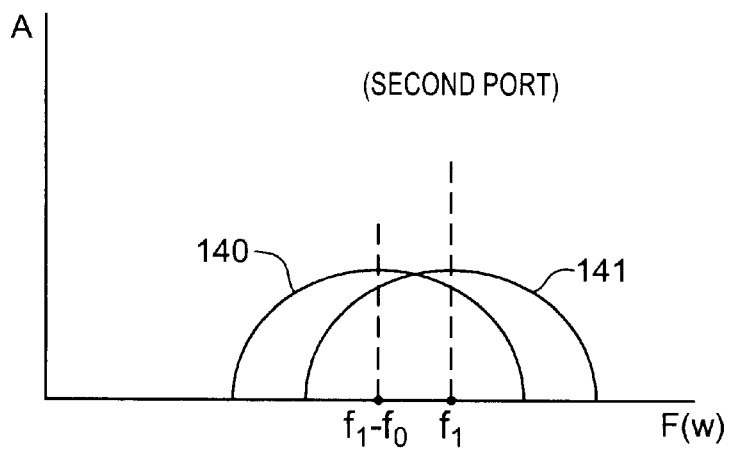

FIGS. 3B and 3C represent signals 166 and 165, respectively, as they appear at ports 162 and 163. As shown, each of signals 166 and 165 have components of both signals 140 and 141 received at antennas 130, 131. For the purpose of FIGS. 3B and 3C, it is assumed for sake of explanation that there has been no downconversion of the backhaul signal prior to transmission over the cable 152. However, if there is downconversion of the backhaul signal, the frequency $F_0$ appearing in FIGS. 3B and 3C could be viewed as the intermediate or baseband frequency to which the backhaul signal has been translated.

FIG. 3B is a diagram showing the signals 140 and 141 as they appear at the first port 162 after being combined by summer 151 and transmitted over the cable 152. Signal 140 originating from the first antenna 130 is centered at the original center frequency $F_1$ as shown, and is unaffected by either mixer 150 or mixer 161. Signal 141 originating from the second antenna 131 is shown as it appears at port 162 after addition of a frequency offset $+F_0$ from mixer 150, and is centered at a frequency of $F_1+F_0$.

Thus, port 162 receives the signal 140 centered at the original center frequency $F_1$ along with an offset version of the signal 141 centered at a frequency of $F_1+F_0$.

Although signals 140 and 141 are shown having similar characteristics, it is assumed, as noted, that signals 140 and 141 may have amplitude, phase and frequency differences caused by various multipath, fading, or other known or unknown factors as mentioned previously.

The port 163 also receives offset versions of antenna signals 140 and 141. FIG. 3C is a diagram representing the output of the second single sideband mixer 161, and shows the same signals 140 and 141 as they appear at port 163 of the base station 164. Antenna signal 141 originating from antenna 131 is provided a frequency offset of $+F_0$ by mixer 150 and an opposite frequency offset of $-F_0$ by mixer 161, resulting in a net frequency displacement of zero. Thus, at port 163, antenna signal 141 appears centered at the original frequency $F_1$. Signal 140 originating from the other antenna 130 is provided a frequency offset of $-F_0$ by mixer 161, and therefore appears centered at a frequency of $F_1-F_0$.

Thus, port 163 receives signal 141 centered at the original frequency $F_1$ and an offset version of signal 140 centered at a frequency of $F_1-F_0$.

Accordingly, the base station 164 simultaneously receives both signals 140 and 141, only one of which is centered at the original center frequency $F_1$ at either of the different ports 162, 163. The base station 164 may demodulate the antenna signals 140, 141, if desired, before filtering them using filters 170, 171.

At each port 162, 163 of the base station 164, the signals 140 and 141 are despread and correlated by correlators 172, 173, using an appropriate spread spectrum reference code, and using techniques known in the art for recovering data modulated in the transmitted signal. Antenna signals 140, 141 are thereby decoupled for further processing. Suitable techniques for correlation and for recovering data from a spread spectrum signal are described, for example, in U.S. Pat. Nos. 5,016,255, 5,022,047, 5,648,982, 5,724,383, 5,761,239, and 5,790,591, each of which is incorporated by reference as if fully set forth herein.

Figure 5:
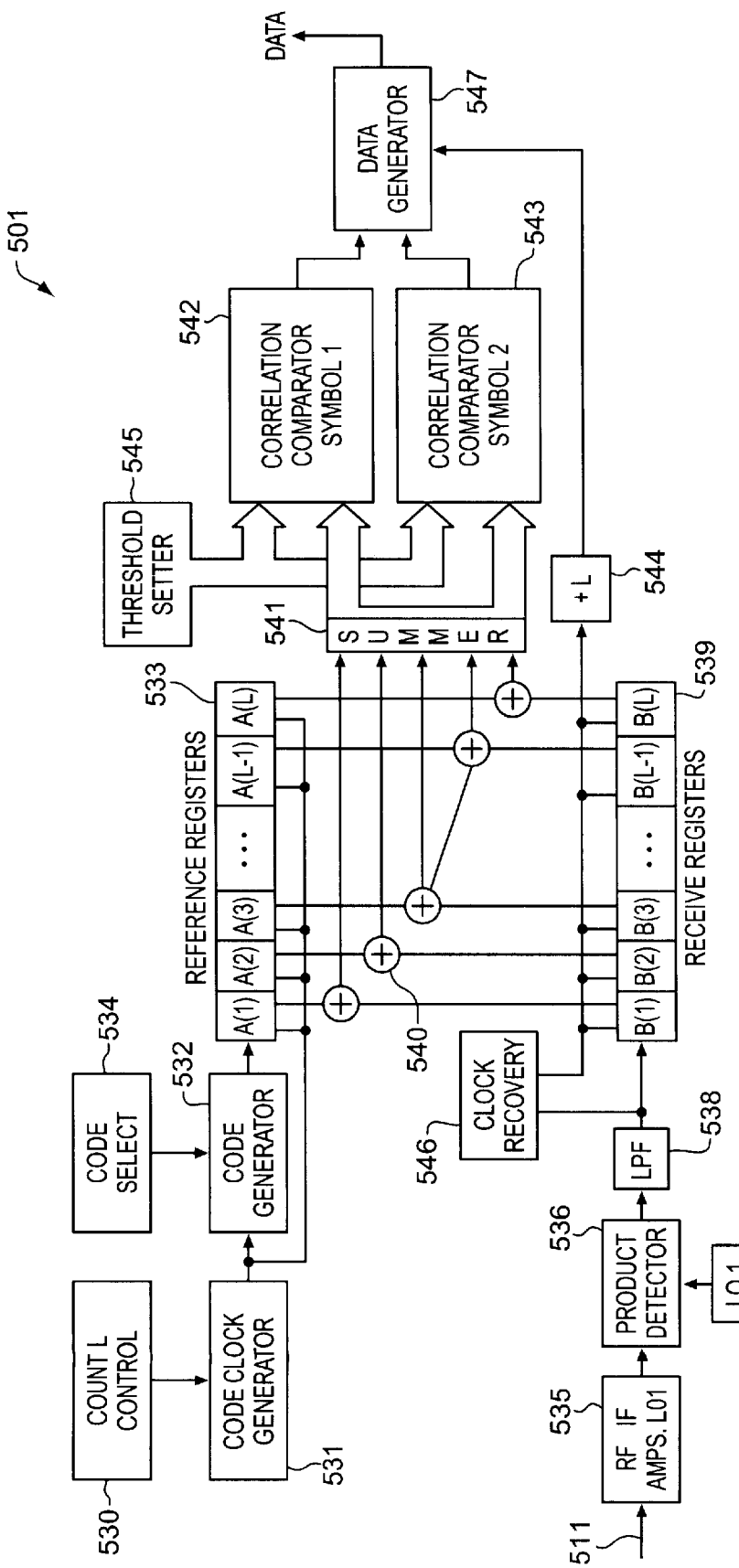
FIG. 5 is a diagram of a spread spectrum correlator as may be used in either of the embodiments shown in FIG. 2 or FIG. 4.

An example of a correlator that may be used in the FIG. 2 embodiment is shown in FIG. 5. In FIG. 5, an input spread spectrum signal 511, e.g. either of signals 165 or 166, may be provided to a correlator 501.

The correlator 501 comprises a count control 530 coupled to a code clock generator 531, which is connected to a code generator 532 and reference registers 533. The code generator 532 is also connected to the reference registers 533. A code selection circuit 534 is coupled to code generator 532. The count control 530 controls the length of the particular pseudo-noise signal (i.e., spread spectrum code) chosen by code selection circuit 534 to be detected by the receiver, and outputs signals to the code clock generator 531 which causes the code generator 532 to output a code of length L to first reference registers 533. Count control 530 triggers code clock generator 531 which thereby triggers code generator 532 and first reference registers 533. Code generator 532 outputs the particular pseudo-noise signal to first reference registers 533 as determined by a code selection circuit 534. The code selection circuit 534 can provide signals to the code generator 532 which enable it to scan through a plurality of pseudo noise codes. In operation, a single code can be loaded into the first reference registers 533 or, in a scanning mode, the first reference registers 533 can be periodically loaded with constantly varying codes until a match to a received code occurs.

The input signal 511 is coupled to an amplifier circuit 535, which may comprise one or more RF or IF amplifiers depending on the characteristics of the input signal 511. The amplifier circuit 535 is coupled to a product detector 536, which is coupled to a local oscillator 537 and a low pass filter 538. The low pass filter 538 is coupled to receive registers 539 and clock recovery circuit 546.

For the case of a correlator having a dual threshold capability, the first reference registers 533 store a first pseudo-noise signal, and the receive registers 539 store the input spread spectrum signal. The first adders 540 compare each chip of the received spread spectrum signal with each respective chip of the first pseudo-noise signal to generate a first plurality of chip-comparison signals. The first summer 541 adds the first plurality of chip-comparison signals and thereby generates a first correlation signal. In response to the first correlation signal being greater than the upper-threshold level, the comparator 542 generates a first data-symbol signal. In response to the first correlation signal being less than the lower-threshold level, the comparator 542 generates a second data-symbol signal.

In operation, an input spread spectrum signal 511 having a data signal modulated with a pseudo-noise signal would be stored in receive registers 539 and the entire length, L, of a first spread spectrum code is stored in first reference registers 533. Each chip of the input pseudo-noise signal is modulo 2 added by each respective chip of the first reference pseudo-noise signal by first adders 540. This modulo addition of the two signals thereby generates a first plurality of chip-comparison signals which is transferred from first adders 540 to first summer 541. The first summer 541 adds the first plurality of signals to generate a first correlation signal.

The first symbol comparator 542 and second symbol comparator 543 are coupled to the first summer 541. The comparators 542, 543 have an upper-threshold level and a lower-threshold level. In response to the first correlation signal being greater than the upper-threshold level, the first symbol comparator 542 generates a first data-symbol-correlation signal. In response to the first correlation signal being less than the lower-threshold level, the second symbol-comparator 543 generates a second data-symbol-correlation signal. Data generator 547 thereby generates first or second data symbols, per the first or second data-symbol-correlation signal, respectively. The first and second data-symbol signals may be, respectively, 1-bit and 0-bit data signals.

The correlator 501 is intended to be an exemplary embodiment of a suitable correlator to be used in conjunction with the FIG. 2 embodiment of the present invention, and it is understood that a variety of other correlators will also be suitable.

Returning to FIG. 2, at port 162, one of the antenna signals (e.g., antenna signal 140) is despread and/or correlated, using, for example, a correlator as shown in FIG. 5. At the other port 163, the other antenna signal (e.g., antenna signal 141) is despread and/or correlated, using, for example, a correlator as shown in FIG. 5.

As seen at each of the two ports 162, 163, the two signals 140 and 141 should not unduly interfere with one another, and should therefore be isolated from each other, if the frequency offset $F_0$ is sufficiently large. It will often be the case that one of the antenna signals 140, 141 will be of better quality than the other, so that the antenna signal (for example, antenna signal 140) corresponding to the antenna with the best received signal (as measured, for example, by signal/noise ratio) will dominate the other antenna signals (for example, antenna signal 141). Because of this phenomenon, additional isolation between the two signals 140 and 141, besides that provided by the frequency offset $F_0$, is provided by the inherent differences in the received signals 140 and 141.

The frequency offset $F_0$ is thus preferably of a predefined minimum size in order to maintain isolation between the two antenna signals 140 and 141. Within this constraint, the frequency offset $F_0$ should also be kept as small as possible to minimize the bandwidth requirements of the cable 152. Thus, in a preferred embodiment of the FIG. 2 system, the transmitted signal 113 is a spread spectrum signal, and the frequency offset $F_0$ applied by the first mixer 150 and the second mixer 161 may be as small as $1/(2 \times CPI)$ Hz, where CPI is the coherent processing interval of the spread spectrum signal 113.

In a preferred embodiment, the spreading bandwidth is 10 MHz, the CPI is 5 microseconds, and the frequency offset $F_0$ is 100 KHz. Thus, when the two antenna signals 140, 141 are overlaid by summer 151, the composite signal occupies a bandwidth of only 10.1 MHz and can be sent over a single backhaul cable 152 having a nominal 10 MHz bandwidth capacity without loss of substantial information. In contrast, use of pure frequency division multiplexing, wherein each antenna signal 110 (as shown in FIG. 1) is transmitted over a frequency band having a bandwidth substantially the same as the transmitted signal 113, would require a substantially larger bandwidth for transmission. For a two antenna system similar to FIG. 2, the bandwidth requirement for a pure FDMA system for transmission over a single backhaul cable would be 20 MHz, or twice the bandwidth of the transmitted signal 113. In the case of N antennas, the bandwidth requirement for a pure FDMA system would be N times that of the transmitted signal 113.

The FIG. 2 embodiment may be employed in a spread spectrum system using an M-ary technique, wherein each data symbol is associated with a particular sequence of data bits and is represented by a unique spread spectrum code. For example, in a 4-ary spread spectrum technique, each of the data bit sequences 00, 01, 10 and 11 (referred to as data symbols) may be represented by a different spread spectrum code (called symbol codes). Thus, in the transmitter, an input data signal may be comprised of a plurality of data symbols, each of which results in the transmission of a corresponding symbol code. In such an M-ary system, the minimum preferred frequency isolation of the FIG. 2 embodiment is provided by a frequency offset $F_0$ of $1/(2 \times T_s)$, where $T_s$ is the transmission time of a data symbol. Such a frequency offset should normally allow sufficient frequency isolation of the two received signals 140 and 141 at the ports 162, 163 of the base station 164 to enable proper despreading.

In a preferred embodiment, after despreading and correlating signals 165 and 166, the base station 164 may measure the quality of the two signals 165, 166 and select one or more of the two signals 165, 166, thereby selecting one or more antennas 131 or 130 for receiving the RF signal 113. For example, the base station 164 may measure a signal/noise ratio of each signal 165, 166, and may select the one with the best signal/noise ratio. The base station 164 may dynamically switch between signals 165 and 166, thereby switching selected antennas 131, 130, as the quality of the received signal changes over time.

Techniques are known in the art for selecting one or more antenna signals to use for communication. One such technique is known as selection diversity, in which one of a plurality of antennas is selected for communication, and is used for communication until the signal quality for that antenna deteriorates. For example, the base station 164 may select signal 165 (thereby selecting antenna 131) for communication, after which the base station 164 continues using antenna 131 for communication. As a result of the comparison of signals 165 and 166, the base station may make another selection decision based on the relative quality of the signals 165, 166.

An advantage of using selection diversity is that only one set of demodulation and despreading hardware is needed at the base station 164. Thus, only one of the pair of filters 170, 171 and one of the pair of correlators 172, 173 is necessary if selection diversity is used. In order to compare both signals 165 and 166, a switch may be used selecting between signals 165 and 166. One of signals 165, 166 is provided to a single filter and correlator, and the signal quality measured, after which the other one of signals 165, 166 is provided to the single filter and correlator, and the signal quality measured. The superior of the two signals 165, 166 is selected for communication thereafter until the measured signal quality deteriorates to an unacceptable level.

Another known technique used in selecting among a plurality of antenna signals is known as combining diversity.

In such a technique, parallel hardware is used to demodulate and despread the signals 165, 166, and to measure signal quality. One or more of the signals 165, 166 is dynamically selected for communication. A maximum likelihood estimator may also be used in conjunction with combining diversity techniques, whereby the signals 165, 166 are weighted depending on their signal quality prior to being combined according to their weighted values.

The described techniques are meant to be illustrative and not exhaustive of the various antenna selection methods that may be employed in the FIG. 2 system, and description thereof is by no means intended to limit the scope of the invention to only those particular antenna selection methods.

An advantage of the FIG. 2 system is that it preserves potentially limited bandwidth of the backhaul cable system. The FIG. 2 system may be contrasted with conventional techniques (such as shown in FIG. 1), wherein each antenna signal 110 to be transmitted over a backhaul cable 105 adds an extra full signal bandwidth requirement to the backhaul cable system. Thus, if each antenna 103 in the conventional system is to receive a spread spectrum signal of 10 MHz and send it to a base station over a single backhaul cable 105, then two receiving antennas would require a backhaul capacity in the cable of 20 MHz, three receiving antennas would require a capacity of 30 MHz, and so on. As the bandwidth requirements for the backhaul cable 105 increase proportionately to the number of receiving antennas, so does the cost and complexity of the antenna electronics.

Moreover, there are practical limitations to the number of antenna signals that may be transmitted over a backhaul cable in the conventional manner. For example, backhaul cables, and/or the electronics used for transmitting signals over backhaul cables, generally have a limited bandwidth capacity, e.g. 25 MHz, particularly with respect to upstream transmission of information. This limited capacity effectively limits the number of antennas that may be connected to a single backhaul cable, and the number of antenna signals that may be transmitted thereover. Such a limitation can be a drawback in existing systems in which expensive backhaul cables of limited bandwidth have been deployed, but where additional receiving antennas are desired but cannot be deployed due to bandwidth constraints of the existing system.

In contrast, an aspect of the present invention as embodied, for example, in the system of FIG. 2, provides the ability to transmit multiple antenna signals over a relatively narrow bandwidth. This ability allows the use of backhaul cables of limited bandwidth capacity, such as existing backhaul cables commonly used in cable TV systems, and may also require the use of fewer amplifiers and other supporting electronics to transmit antenna signals over the backhaul cable.

The FIG. 2 embodiment is suitable for many diverse applications, including communication systems using direct sequence or frequency hopping spread spectrum communication techniques. The FIG. 2 embodiment may not be optimal for use in a system using solely time division multiple access (TDMA) techniques, without the addition of spread spectrum encoding.

Figure 4:
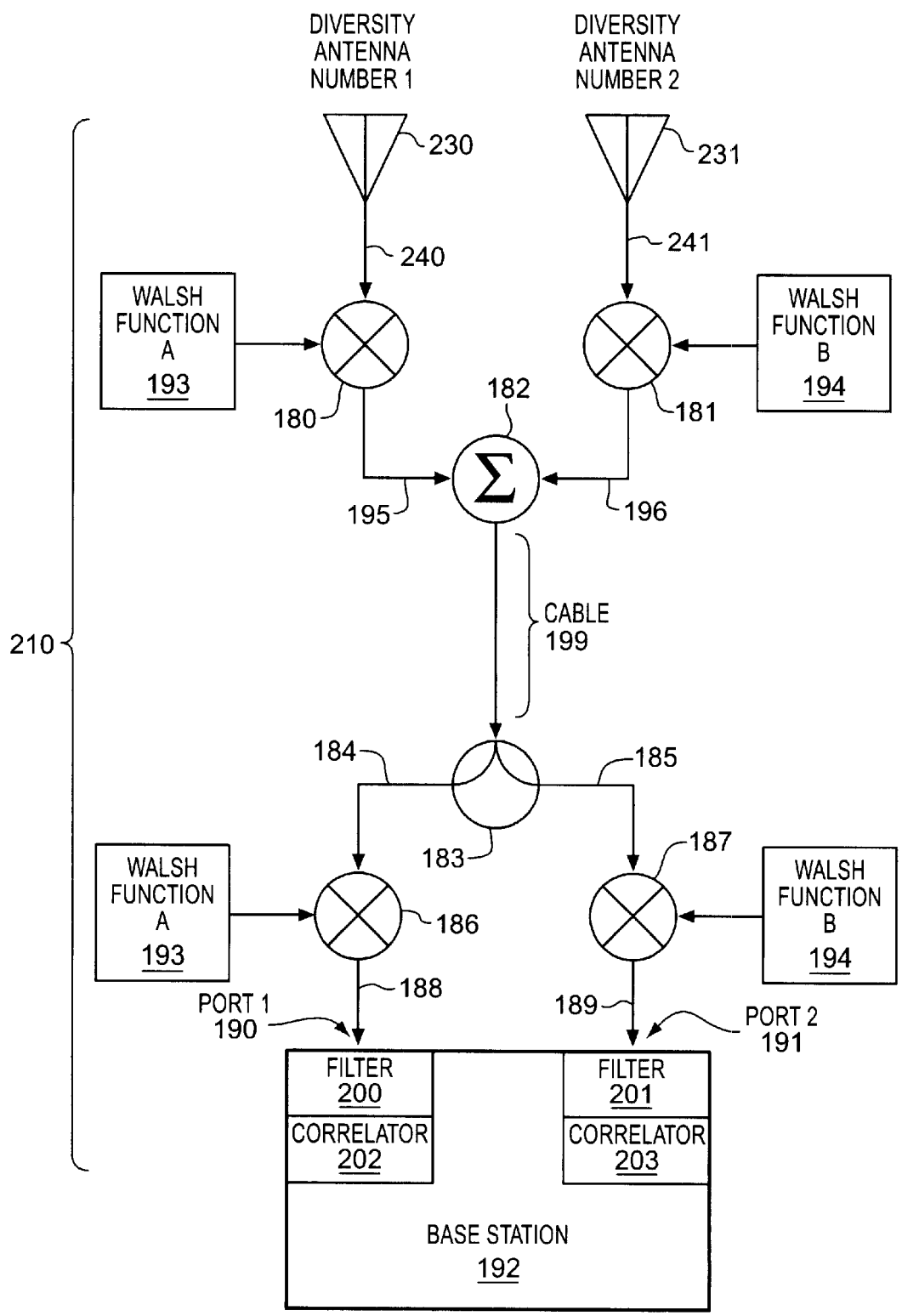
FIG. 4 is a functional block diagram of another embodiment of a multiple antenna receiver system using a single backhaul cable.

FIG. 4 is a functional block diagram of another embodiment of the invention. The FIG. 4 embodiment may be used in conjunction with a pure TDMA system, or a variety of other communication systems. Although the FIG. 4 embodiment is shown for convenience with two antennas, the described techniques are extensible to an arbitrary number of antennas as required by a particular application.

In the system of FIG. 4, a receiver system 210 receives an RF signal 113 from a transmitter 114, which may be one of a plurality of transmitters 114 (as shown in FIG. 1) from which the receiver system 210 may receive the RF signal 113.

The receiving system 210 of FIG. 4 comprises at least two antennas 230 and 231 which are spatially separated. In response to receiving the transmitted signal 113, a plurality of antenna signals 240, 241 are generated by the antennas 230, 231, respectively. Because the antennas 230, 231 are spatially separated, they may experience different fading effects and path losses. The antenna signals 240, 241 may therefore differ in amplitude and phase, and may also experience slight deviations in frequency.

In response to receiving the transmitted signal 113, a plurality of antenna signals 240, 241 are generated by the antennas 230, 231, respectively. The antenna signals 240, 241 are code division multiplexed prior to transmission on the backhaul cable 199 using a spread spectrum transmission technique.

In one embodiment in accordance with FIG. 4, each antenna signal 240, 241 is modulated with a different chip code and then transmitted over a backhaul cable 199. Thus, the first antenna signal 240 is modulated with a first chip code 193 by a modulator 180 to generate a spread spectrum signal 195. The second antenna signal 241 is modulated with a second chip code 194, distinct from the first chip code 193, by another modulator 181 to generate another spread spectrum signal 196. The modulators 180 and 181 may each comprise a modulo-2 adder or an exclusive-OR gate.

The spread spectrum signals 195 and 196 are combined by a summer 182. An output of the summer 182 is a combined signal (also called a backhaul signal herein), which is transmitted along the backhaul cable 199. The backhaul signal essentially comprises two overlaid signals, which are antenna signal 240 modulated by the first spread spectrum code 193, and antenna signal 241 modulated by the second spread spectrum code 194. Prior to transmission over the cable 199, the backhaul signal is preferably downconverted to an intermediate frequency or a baseband frequency, using one or more mixers, filters, amplifiers or other electronics and reconverted to a suitable IF at the receiver end (not shown). For example, the backhaul signal may be made suitable for transmission over a coaxial cable, fiber optic cable, or other type of transmission media using methods known in the art. Alternatively, circuitry for converting the antenna signals 240, 241 to an intermediate frequency or a baseband frequency may be located further upstream at each antenna, at the expense of additional or possibly duplicative hardware.

At the other end of the cable 199, the combined signal is split by a splitter 183 into two duplicate signals 184, 185. One duplicate signal 184 is despread and correlated with the first spread spectrum signal 193 by a correlator 186. The other duplicate signal 185 is despread and correlated with the second spread spectrum code 194 by another correlator 187. Each of correlators 186, 187 may comprise a correlator such as shown in FIG. 5, or any of the patents previously incorporated herein.

An output 188 of correlator 186 is coupled to a port 190 of a receiver 192 (e.g., a base station). An output 189 of the other correlator 187 is coupled to another port 191 of the base station 192. As explained below, the output of correlator 186 is essentially a recovered version of the first antenna signal 240, and the output of correlator 187 is essentially a recovered version of the second antenna signal 241.

Correlator 186 receives from the cable 199 the backhaul signal which, as noted, comprises the first antenna signal 240 modulated by the first spread spectrum code 193, and the second antenna signal 241 modulated by the second spread spectrum code 194. Correlator 186 correlates the backhaul signal with the first spread spectrum code 193, and in doing so recovers the first antenna signal 240 encoded with the same spread spectrum code 193. However, correlator 186 rejects the second antenna signal 241, which has been encoded with the second spread spectrum code 194. The correlator 186 thereby essentially converts the second antenna signal 241 into noise, as the product of two distinct chip codes (such as the first chip code 193 and second chip code 194) generally creates a signal having a noise-like distribution.

Correlator 187 operates on the same principle for recovering the second antenna signal 241 while rejecting the first antenna signal 240. By operation of correlators 186 and 187, antenna signals 240 and 241 are thereby decoupled from one another.

Outputs from each of correlators 186 and 187 are coupled to different ports 190, 191 of the base station 192. Thus, the base station 192 simultaneously receives a recovered version of the first antenna signal 240 at the first port 190 and a recovered version of the second antenna signal 241 at the second port 191.

The correlators 186, 187 may embody correlation techniques such as described in U.S. Pat. Nos. 5,016,25, 5,022,047, or described herein with respect to FIG. 5, or as described in any of the patents previously incorporated by reference. The precise correlation method selected depends in part on hardware constraints and the particular spread spectrum encoding scheme employed by modulators 180, 181. Correlation may be either serial or parallel, either coherent or non-coherent, and may utilize synchronization and tracking techniques (if necessary) as described in the previously referenced patents or as otherwise known in the art.

Figure 6B:
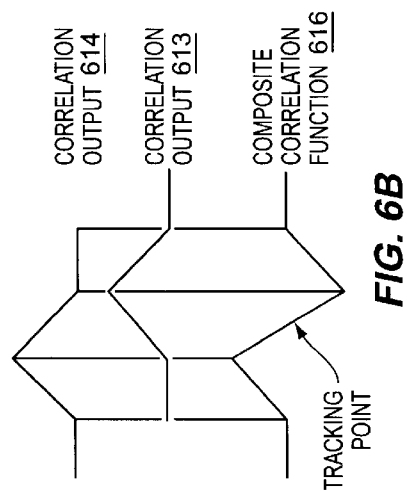
FIG. 6A is a block diagram of a delay lock tracking loop, and FIG. 6B are waveform diagrams in accordance therewith.
Figure 6A:
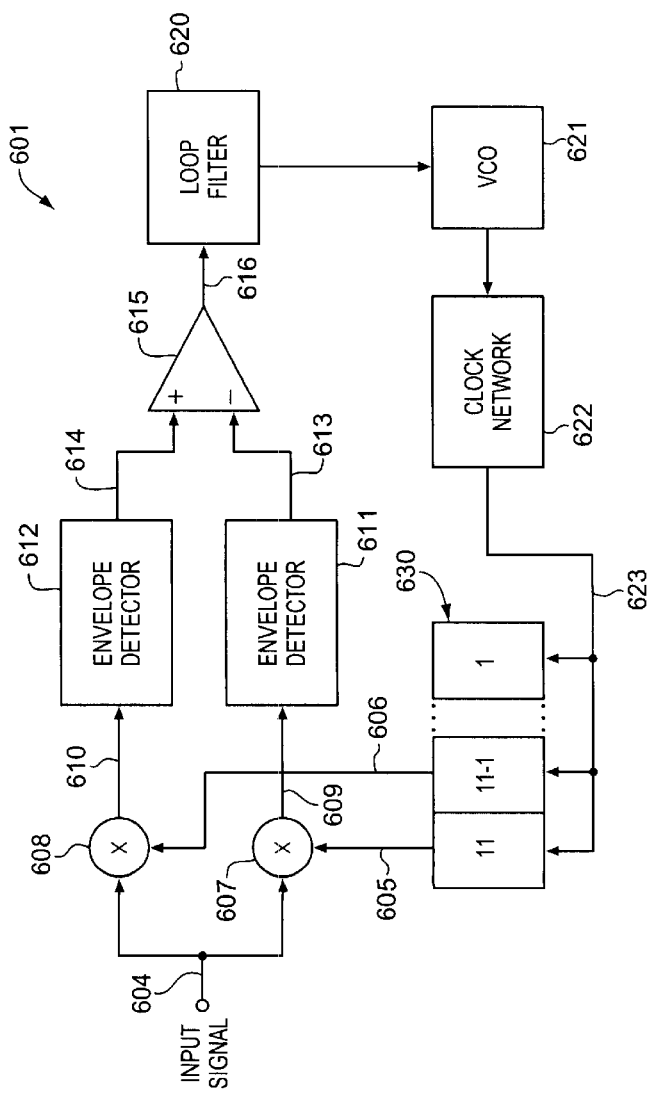

For example, the FIG. 4 embodiment may use a delay lock tracking loop 601 such as shown in FIG. 6A for maintaining synchronization between modulators 180, 181 and correlators 186, 187. The problem addressed by a delay lock tracking loop may be described as follows. Although an identical version of spread spectrum code 193 may be generated locally at both modulator 180 and correlator 186, the local versions of spread spectrum code 193 may be delayed in time from one another. Likewise, although an identical version of spread spectrum code 194 may be generated locally at both modulator 181 and correlator 187, the local versions of spread spectrum code 194 may be delayed in time from one another. Assuming initial synchronization has already been accomplished (e.g., by using a sliding coincidence correlator or similar means), the amount of delay between the local versions of the spread spectrum codes 193, 194 is usually one or two chips.

In the delay lock tracking loop 601 of FIG. 6A, two local reference signals 605, 606 having a time delay are generated, and are used for comparison with a single incoming signal 604 in two separate correlators 607, 608. A register 630 stores all or a portion of a locally generated version of a spread spectrum code, such as spread spectrum code 193 or 194. Local reference signal 605 is derived from the last chip (i.e., the Nth chip) stored in register 630, while local reference signal 606 is derived from the next to last chip (i.e., the (N−1)th chip) stored in register 630. Local reference signals 605 and 606 are thereby delayed by one chip time from one another.

Local reference signal 605 is correlated with the input signal 604, such as signal 184 or 185, using correlator 607. Local reference signal 606 is correlated with the input signal 604 using correlator 608. Upon correlation, the output 609 of correlator 607 will ordinarily be a triangular function two chips wide. Likewise, upon correlation, the output 610 of the correlator 608 will ordinarily be a triangular function two chips wide, but offset in time with respect to output 609 by the amount of delay between the Nth chip and the (N−1)th chip. The output 609 of correlator 607 is coupled to an envelope detector 611. The output 610 of correlator 608 is coupled to another envelope detector 612.

An output from each of the envelope detectors 611, 612 is coupled to an input of a comparator 615, which generates a composite correlation output 616. The composite correlation output 616, as shown in FIG. 6B, has a double-peaked triangular shape, in which one-half of the double triangle is inverted, so that the composite correlation has a linear region centered around the point halfway between the two correlation maxima. The composite correlation output 616 is coupled to a loop filter 620 and used to control a clock source 621, such as a voltage controlled oscillator (VCO). The clock source 621 is coupled to a clock network 622, which provides a code clock signal 623 for clocking the locally generated spread spectrum code. The delay lock tracking loop 601 thereby causes the local reference signals 605, 606 to track the incoming signal 604 at a point halfway between the maximum and the minimum of the composite correlation output 616.

Further details regarding delay lock tracking loops and other tracking techniques may be found in R. Dixon, *Spread Spectrum Systems with Commercial Applications* (John Wiley & Sons, 3d ed. 1994), pages 254–264.

Alternatively, an auto-synchronous correlator, such as that described in each of U.S. Pat. Nos. 5,724,383, 5,761,239, and 5,790,591 referenced previously herein, may be used for each of correlators 186, 187, eliminating at least some of the additional overhead for maintaining synchronization.

In a preferred embodiment, each antenna signal 240, 241 is spread spectrum encoded using a code sequence that is a Walsh function. Walsh function code sequences for spread spectrum encoding are known in the art. Orthogonal Walsh functions are selected for each antenna signal 240, 241; thus, spread spectrum code 193 comprises a first Walsh function, and spread spectrum code 194 comprises a second Walsh function orthogonal to the first Walsh function. The spread spectrum encoded signals 195, 196 are, after being combined and transmitted over the cable 199, despread using the same orthogonal Walsh functions 193, 194, respectively. The orthogonal Walsh functions provide sufficient isolation between antenna signals 240, 241 so that frequency isolation such as described with respect to FIGS. 2 and 3A–3C is generally unnecessary.

In one embodiment, one of the Walsh functions 193, 194 is a sequence of all 1's. Use of such a Walsh function essentially eliminates the need for one branch of hardware. For example, the second modulator 181 and second correlator 187 could be eliminated in this embodiment, and the first spread spectrum code 193 would preferably be selected so as to be orthogonal with a sequence of all 1's.

If orthogonal Walsh functions are not used, then slight frequency isolation may be desirable between the spread spectrum signals 195, 196. The required isolation between the spread spectrum signals 195, 196 is generally low. This is so because a frequency separation for spread spectrum signals does not generally have to be large in comparison with the bandwidth of the spread spectrum signals. The frequency offset chosen should be sufficient to cause lack of correlation of each spread spectrum signal 195, 196 by a correlator matched to the other spread spectrum signal. Also, as noted with respect to FIG. 2, the level of interference between the two overlaid spread spectrum signals is in many cases reduced because one of the two antenna signals 240, 241 will dominate the other at least to some degree over periods of time, reducing the need for additional isolation.

Spread spectrum encoding techniques, such as M-ary techniques, may be employed at the first and second modulators 180, 181. In such a case, the first and second correlators 186, 187 may comprise corresponding hardware as conventionally used in the art for despreading and decoding the backhaul signal.

The ports 190, 191 may each comprise a filter 200, 201, respectively, and, if a spread spectrum signal is being received, a despreading and/or correlating circuit 202, 203, respectively. Despreading/correlating circuits 202, 203 may each comprise a correlator such as described in the previously cited patents or for example as shown in FIG. 5. The signal received at antennas 230, 231 need not be a spread spectrum signal, and thus each of the ports 190, 191 may comprise appropriate hardware for demodulating the particular type of signals sent.

The base station 192 may thereafter select one or more of the signals 188, 189 for communication, and thereby select one or more of the antennas 230, 231 based on the relative quality of the signals 188, 189, in a manner similar to that described with respect to the FIG. 2 embodiment. Thus, for example, the base station 192 may utilize selection diversity, combining diversity, or any other type of antenna selection method as known in the art.

The present invention may be used in polarization diversity. In polarization diversity, a single antenna may have a vertical polarization signal and a horizontal polarization signal requiring transmission to a receiver. To deliver both the vertical and the horizontal polarization signals normally requires the ability to send a signal having twice the bandwidth as the received signal. Applying the inventive techniques described herein to polarization diversity, the vertical and horizontal polarization signals, like diverse antenna signals 140 and 141, may be combined for transmission along a single cable.

In another alternative embodiment, time division multiplexing may be used to increase the throughput over a backhaul cable 152 (or 199). In time division multiplexing, a defined time period is divided into a plurality of time frames, and each time frame is further divided into a plurality of time slots. Each antenna signal 140, 141 (or 240, 241) may be periodically sampled using A/D sampling at a rate corresponding to at least twice the bandwidth of the received signal. Each time slot of a time frame may be assigned to a specific antenna and used for transmission of the data sampled from that antenna. Generally, each antenna would be serviced in at least one time slot in each time frame. For example, the first time slot may be used to transmit sampled data from the first antenna, the second time slot to transmit sampled data from the second antenna, and so on, until data from all the antennas is transmitted over the backhaul cable. Each additional antenna therefore increases the number of necessary time slots proportionately. A conventional cable suitable for TDMA transmission is a SONeT cable.

Although embodiments have been described with respect to systems utilizing diverse antenna signals, it is contemplated that the inventive techniques set forth herein are usable and workable in other systems, and can without undue modification or experimentation be applied to related systems and applications that would benefit from such techniques. The scope of the rights conferred shall not be limited, therefore except within the spirit and scope of the appended claims.

I claim:

1. A communication system, comprising:

a plurality of antennas generating a plurality of antenna signals in response to said plurality of antennas receiving a radio frequency signal;

a combining circuit having a plurality of inputs coupled to said plurality of antennas and an output from which a backhaul signal incorporating antenna signals from said plurality of antennas is output, said combining circuit including (a) a plurality of modulators having a plurality of inputs coupled to said plurality of antennas and a plurality of outputs, and (b) a summer circuit having a plurality of inputs coupled to said plurality of outputs of said plurality of modulators and an output;

a backhaul cable connected to said output of the summer circuit to conduct said backhaul signal from said output of said combining circuit to a second end thereof;

a decoupling circuit having an input coupled to said second end of said backhaul cable to separate said backhaul signal so as to generate a plurality of recovered antenna signals correlating to said plurality of antenna signals; and a receiver having a plurality of ports coupled to receive said plurality of recovered antenna signals from said decoupling circuit;

the backhaul signal having a bandwidth substantially less than a sum of bandwidths of the plurality of antenna signals.

2. The communication system of claim 1 wherein:

said decoupling circuit includes (a) a splitter having an input coupled to said second end of said backhaul cable and a plurality of outputs, and (b) a plurality of correlators having a plurality of inputs coupled to said plurality of outputs of said splitter and a plurality of outputs coupled to said plurality of ports of said receiver;

said plurality of modulators modulate the plurality of antenna signals with respective Walsh function codes each selected from a set of orthogonal Walsh functions.

3. The communication system of claim 1 wherein:

said receiver selects at least one of said plurality of recovered signals in response to a plurality of reception qualities of said plurality of recovered antenna signals.

4. The communication system of claim 3 wherein said receiver uses selection diversity for selecting said at least one of said plurality of recovered signals.

5. The communication system of claim 3 wherein said receiver uses combining diversity for selecting said at least one of said plurality of recovered signals.

6. A communication system, comprising:

at least two antennas for receiving signals from a remote device;

a combining circuit capable of receiving an input from each of said at least two antennas and generating an output having a combined signal that includes said signals received from said at least two antennas, said combining circuit including (a) modulators having inputs coupled to said antennas and outputs, and (b) a summer circuit having inputs coupled to said outputs of said modulators and an output; said combined signal having a bandwidth that is substantially less than the sum of the bandwidths of said input from each of said at least two antennas;

a backhaul cable, coupled to the output of the summer circuit, capable of transmitting said generated output of said combining circuit;

a decoupling circuit capable of receiving said generated output of said combining circuit from said backhaul cable and capable of separating said generated output of said combining circuit to respective signals received from said at least two antennas.

7. The communication system of claim 6 wherein said input from each of said at least two antennas is spread spectrum encoded and combined to generate said combined signal.

8. The communication system of claim 7 wherein said input from each of said at least two antennas is code division multiplexed to generate said combined signal.

9. The communication system of claim 8 wherein:
an output of one of said plurality of antennas is modulated with a first chip code and an output of another said plurality of antennas is modulated with a second chip code, said first chip code and said second chip code being distinct.

10. The communication system of claim 6 wherein said receiver is capable of selecting at least one of said signals from said at least two antennas in response to a plurality of reception qualities of said signals from said at least two antennas.

11. The communication system of claim 6 wherein said receiver is capable of selecting at least one of said signals from said two antennas using selection diversity.

12. The communication system of claim 6 wherein said receiver is capable of selecting at least one of said signals from said two antennas using combining diversity.

13. A method of receiving a wireless signal comprising:
generating an antenna signal from each of at least a plurality antennas in response to the wireless signal;
combining each of said antenna signals into a backhaul signal having a bandwidth that is substantially less than the sum of each of said signals, wherein combining each of said antenna signals into a backhaul signal comprises:
modulating the antenna signals; and
adding the modulated antenna signals at summer circuits;
transmitting said backhaul signal through a backhaul cable;
separating said backhaul signal into recovered antenna signals correlating to each of said antenna signals
selecting at least one of said recovered antenna signal according for processing.

14. The method as claimed in claim 13 wherein combining each of said antenna signals into a backhaul signal includes incorporating each of said antenna signal into a backhaul signal using a spread spectrum encoding technique.

15. The method as claimed in claim 14 wherein combining each of said antenna signals into a backhaul signal includes code division multiplexing each of said antenna signal.

16. The method as claimed in claim 13 wherein combining each of said antenna signals into a backhaul signal includes modulating each of said antenna signals with a chip code, said chip code for each of said antenna signals being distinct.

17. The method as claimed in claim 13 wherein selecting at least one of said recovered antenna signal according for processing includes selecting at least one of said recovered antenna signal using selection diversity.

18. The method as claimed in claim 13 wherein selecting at least one of said recovered antenna signal according for processing includes selecting at least one of said recovered antenna signal using combining diversity.

19. The method as claimed in claim 13 further comprising downconverting said backhaul signal to a baseband frequency prior to transmitting said backhaul signal.

20. The method as claimed in claim 13 wherein separating said backhaul signal into recovered antenna signals correlating to each of said antenna signals includes splitting said backhaul signal into duplicate signals and recovering a respective antenna signals from each of said duplicate signals.

21. A communications system, comprising:
at least two antennas for receiving signals from a remote device;
a combining circuit capable of receiving an input from each of said at least two antennas and generating an output having a combined signal generated by code division multiplexing said signals received from said at least two antennas using a spread spectrum transmission technique; said combining circuit including (a) modulators receiving the input from each of said at least two antennas and generating outputs, and (b) a summer circuit having inputs coupled to said outputs of said modulators and an output;
a backhaul cable capable of transmitting said generated output of said combining circuit;
a decoupling circuit capable of receiving said generated output of said combining circuit from said backhaul cable and capable of separating said generated output of said combining circuit to respective signals received from said at least two antennas.

22. The communication system claimed in claim 21 wherein an output of one of said plurality of antennas is modulated with a first chip code and an output of another said plurality of antennas is modulated with a second chip code, said first chip code and said second chip code being distinct.

23. The communication system of claim 21 wherein said receiver is capable of selecting at least one of said signals from said at least two antennas in response to a plurality of reception qualities of said signals from said at least two antennas.

24. The communication system of claim 21 wherein said receiver is capable of selecting at least one of said signals from said two antennas using selection diversity.

25. The communication system of claim 21 wherein said receiver is capable of selecting at least one of said signals from said two antennas using combining diversity.

* * * * *